May 20, 1969     B. S. SEDLEY     3,444,711

MAGNETICALLY OPERATED MECHANISM AND MAGNETIC CARD

Filed Nov. 4, 1966

INVENTOR.
BRUCE S. SEDLEY

BY

ATTORNEYS

INVENTOR.
BRUCE S. SEDLEY
ATTORNEYS

INVENTOR.
BRUCE S. SEDLEY
ATTORNEYS

United States Patent Office 3,444,711
    Patented May 20, 1969

1

3,444,711
MAGNETICALLY OPERATED MECHANISM
AND MAGNETIC CARD
Bruce S. Sedley, 7 Murray Ave.,
Larkspur, Calif. 94939
Filed Nov. 4, 1966, Ser. No. 592,006
Int. Cl. E05b 47/00, 19/26
U.S. Cl. 70—276  7 Claims

ABSTRACT OF THE DISCLOSURE

A magnetically operated mechanism which includes a lock plate and magnet block mounted for relative movement with respect to one another. A plurality of locking pins in the form of magnets carried by the magnet block and in the locked position serving to lock the magnet block and lock plate so that they cannot move relative to one another. Said mechanism being unlocked by means of a card having magnetic spots at selected areas whereby to permit relative movement of the magnet block and lock plate to operate associated apparatus.

---

This invention relates generally to a magnetically operated mechanism and to a magnetic card for use therewith.

Card-operated locks or mechanisms are known in the art. One such lock comprises a locking pin section which carries a plurality of axially movable magnetic pins having a north magnetic pole at one end and a south magnetic pole at the other, at predetermined locations. Interconnected slidable locking plates are arranged one on each side of the locking pin section. The locking plates are provided with recesses or holes for receiving the corresponding ends of the locking pins. The plates are arranged so that the holes or recesses are normally in registration with the locking pins. The holes or recesses on opposite ends of each of the pins are of different diameter, and each of the locking plates includes holes or recesses of different diameter. A base section is disposed adjacent the locking pin section. It carries a plurality of magnetic pins which coincide with the locking pin location. These magnetic pins also include north and south magnetic poles at opposite ends. The magnetic pins serve to either attract or repel the magnetic locking pins depending upon whether unlike or like magnetic poles face one another. When the pins are repelled, they are urged upwardly whereby to engage the recesses in the upper locking plate.

In order to unlock the locking plates, a card having magnetic shims at predetermined locations is inserted. The shims intercept the magnetic fields of corresponding magnetic pins and thereby allow the locking pins to fall downwardly under the influence of gravity to be retracted from the upper holes. If the shims are properly arranged, only those pins engaging the small upper holes fall downwardly into the lower plate while the pins engaging the larger holes remain repelled upwardly. Thus, both of the plates, which are connected to one another, can be moved a distance corresponding to the difference in diameter between the pins and the enlarged holes. If a card having the improper shim pattern is inserted, all of the pins in small holes will not fall and the upper locking plate is not released. If too many shims are placed on the card, pins repelled upwardly onto large holes will fall downwardly into small holes and lock the lower locking plate. Thus, only a card having the proper shim combination can release the locking plates to unlock the lock.

Cards of this type are formed with the shims disposed at proper locations and sandwiched between laminations of plastic or paper. These shims can be easily detected and, therefore, the card can be duplicated. Once a card of

2 this type is manufactured, the code or combination cannot be changed. A new card is required when the combination of the lock is changed. Furthermore, the pin pattern on the lock itself must be altered to correspond to the new combination and the locking plate must be replaced by a locking plate having a corresponding hole pattern.

It is a general object of the present invention to provide an improved magnetically operated mechanism, such as a lock, and magnetic card therefor.

It is another object of the present invention to provide a card which is magnetic and easily coded and recoded by the use of simple equipment.

It is a further object of the present invention to provide a magnetic card which carries the combination in the form of permanently magnetized spots of selected polarity.

It is a further object of the present invention to provide a magnetically operated mechanism of the above type which is simple in construction.

It is a further object of the present invention to provide a mechanism of the above type in which the combination can be easily changed.

It is a further object of the present invention to provide a magnetically operated mechanism which can be operated in a number of positions.

It is another object of the present invention to provide a mechanism which is operable by magnetic cards in which the card receiving opening cannot be easily obstructed.

It is another object of the present invention to provide a magnetic lock which can be used either in conjunction with an electrical switch or a mechanical linkage to provide an access control for doors, gates, elevators or to control electrical equipment.

The foregoing and other objects of the invention will become more clearly apparent from the following description when taken in conjunction with the accompanying drawings.

Referring to the drawings:

FIGURES 1, 2, 3 and 4 are sectional views of a magnetically operated mechanism, taken generally along the lines 1—1, 2—2, 3—3 and 4—4 of FIGURE 6, showing the disposition of the magnetic locking pins in various stages of operation of the mechanism;

Figure 1:
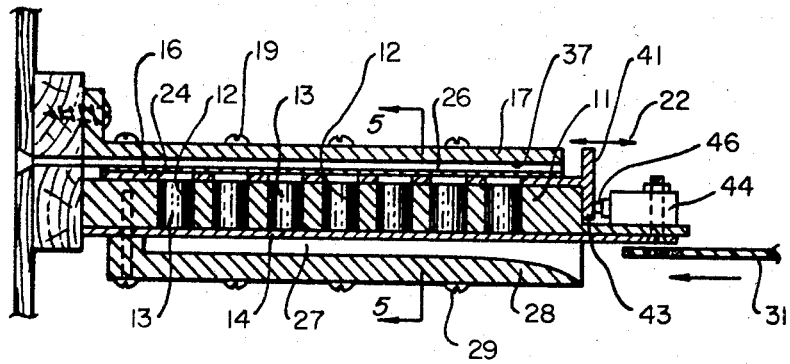

Referring to FIGURES 1–6, the lock comprises a magnet block 11 of non-magnetic material such as plastic or aluminum. The block 11 is provided with a plurality of spaced wells 12 which receive locking or magnet pins 13. In the illustrative example, the wells 12 are circular in section and adapted to receive cylindrical pins 13. It will be apparent from the description to follow that the wells may have any other configuration adapted to slidably receive pins 13 of like configuration. A non-magnetic plate 14 is disposed on the lower side of the magnet block 11 to prevent the slidable pins 13 from falling out of the wells. It is apparent that rather than a non-magnetic plate 14, the wells 12 may terminate short of the bottom of the magnet block to provide a bottom for the same purpose.

A non-magnetic lock plate 16 is mounted above the magnetic magnet block 11. It is mounted so that it can slide back and forth on the surface of the magnet block. The slide means may comprise a pair of spaced guides 17 and 18 which are suitably secured as, for example, by means of screws 19 to the magnet block 11. The guides include a shoulder 21 adapted to engage the side edges of the locking plate to hold it against the magnetic block while permitting sliding movement in the direction generally shown by the arrow 22. The slidable lock plate 16 includes wells or holes 24 which coincide with the wells 12 when the lock plate is in the lock position.

A non-magnetic plate 26 is also engaged and held by shoulder 21. The plate 26 prevents the pins 13 from falling out of the wells 12 through the holes 24 formed in the lock plate. Rather than employing a retaining plate, the holes 24 may be bottomed.

A pocket or recess 27 for receiving a code combination set card, to be presently described, is formed by guide member 28 secured to the magnet block 11 by screws 29. The mechanism described may have a combination set into it by employing a magnetic combination set card to lock the same and unlocked or activated by a magnetic combination activation card.

Figure 7:
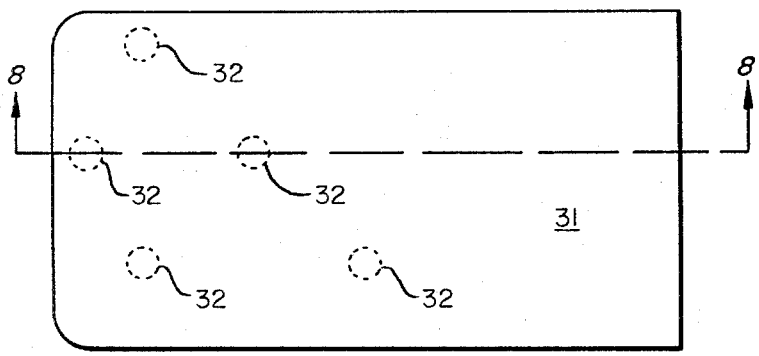
FIGURE 7 is a plan view of a magnetic card suitable for use in operating the magnetically operated mechanism of the present invention.
Figure 8:
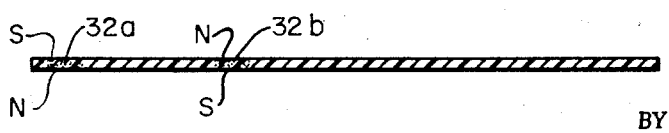
FIGURE 8 is a sectional view taken along the line 8—8 of FIGURE 7.

The set and activation cards may, for example, comprise a sheet of bonded barium ferrite composite material, that is, a material which has ferrite particles suspended in a rubber or plastic matrix or binder. Preferably, the particles are mechanically oriented as, for example, by applying a magnetic field during solidification of the matrix. Thus, the card is magnetic and can be selectively magnetized. The distributed material provides a relatively high reluctance in a direction parallel to the face of the card whereby there is little interaction between adjacent magnetized spots or areas. A typical card 31 is shown in FIGURES 7 and 8. The dotted outlines 32 indicate magnetized spots.

The spots 32 may be magnetized by an electro-magnet which includes pole pieces forming a gap adapted to receive the card and having a diameter corresponding to the diameter of the magnetized spots 32. The spots can be magnetized so that the north or south magnetic pole appears on a given face. For example, as shown in FIGURE 8, the first spot 32a is shown with a south pole at the top face and a north pole at the bottom face, whereas the spot 32b has a north pole at the top face and a south pole at the bottom face. Since the card is made of permanent magnet material, it will retain the magnetization at the various spots. A particular location for each of the magnetized spots 32 may be selected by indexing means which serves to index both longitudinally and across the card. The location of the spots on the card corresponds to the location of the wells 12 and 24.

It is to be observed that when the pins 13 are fully seated in their respective wells, the lock plate 16 can slide with respect to the magnet block, i.e., FIGURE 1. However, if one or more pins are projected upwardly into the holes 24 of the lock plate, it cannot move, i.e., FIGURE 2.

Figure 2:
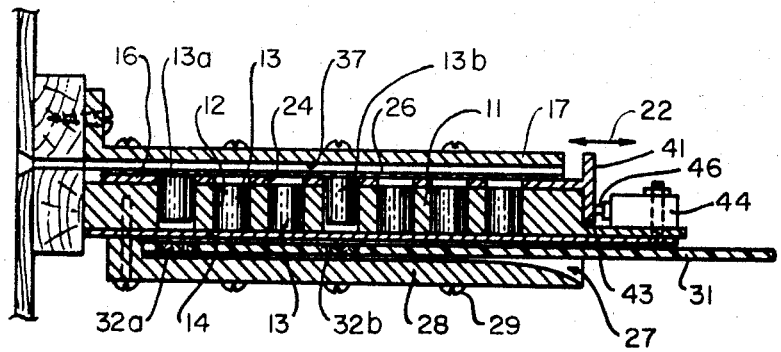
Figure 3:
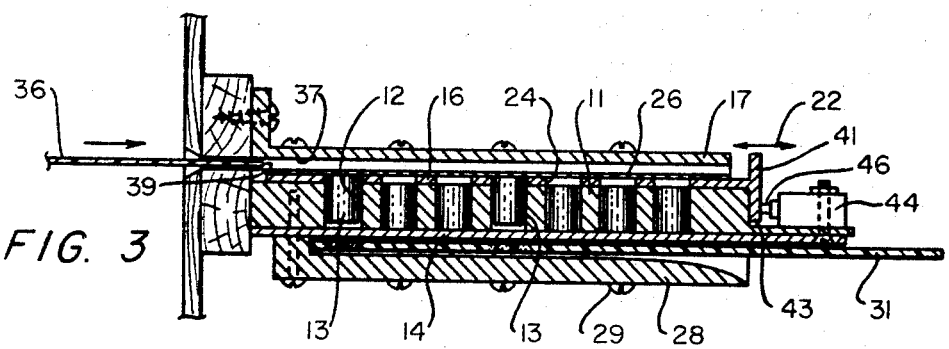
Figure 4:
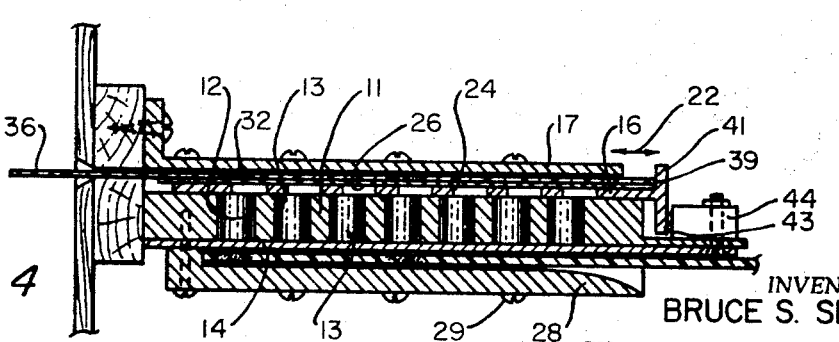
Figure 5:
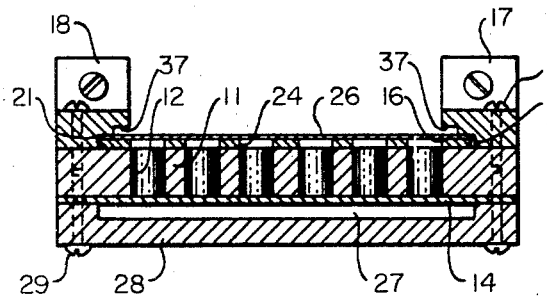
FIGURE 5 is a sectional view of the magnetically operated mechanism taken generally along the line 5—5 of FIGURE 6.

Selected pins 13 can be projected upwardly to the lock plate 16 by inserting a code combination set card 31 having a predetermined pattern of magnetized spots 32, FIGURE 2, and unlocked by inserting a code combination activation card 36 having a complementary pattern of magnetized spots 32 to urge the selected pins 13 back into their wells 12 to release the plate 16, FIGURE 4.

Referring particularly to FIGURE 2, a lock is shown with a code combination set card 31 (hereinafter referred to as "set card") inserted on the recess 27. It is seen that a number of the pins 13 are in their lower or retracted position, which is the normal position which they obtain under the influence of gravity. However, it is observed that two of the pins 13 are raised or advanced to project into the corresponding wells 24 of the lock plate 16. The pins are raised by the force of repulsion between the permanently magnetized spots 32a and 32b and the corresponding magnet lock pins 13. In the example shown, the magnet pins 13a have an upper north magnetic pole and a lower south magnetic pole which is repelled by the south magnetic pole of the magnetized spot 32a. The magnetic locking element 13b has an upper south magnetic pole and lower north magnetic pole which, in turn, is repelled by the north magnetic pole of the magnetized spot 32b.

At this point, it should be pointed out that the locking pins 13 may be placed in holes 12 with the north or south magnetic poles pointing in a given direction. The code combination set card is then magnetized with a polarity such as to repel selected ones of the pins to project or urge them into the holes 24 of the lock plate 16.

In order to unlock the lock having its magnet pins set in a predetermined combination, such as shown in FIGURE 2, a code combination activation card 36, which in essence is the key for unlocking the lock, is required. The activation card is inserted under the shoulders 37 formed in the spaced guides 17 and 18 and immediately overlies the plate 26. If the code activation card carries the proper combination of the magnetized spots 32, then it will repel downwardly the locking pins 13a, 13b and any ther magnet which is advanced upwardly. It is to be noted that the spots must not only be properly located but they must also have the proper polarity. Thus, as the code card 36 is inserted, it will urge the locking pins 13a, 13b and others downwardly. Further insertion will cause the front end 39 to abut the upwardly turned end 41 of the lock plate 16 and move the lock plate rearwardly. If the card does not carry the proper combination, then one or more of the locking pins will remain in its projected position and prevent movement of the lock plate 16. The only way that the plate can be moved is to shear off the raised locking pins.

Referring to the particular example, the code activation card 36 would carry magnetized portions 32a, 32b and others corresponding to the magnetic spots on the code combination set card. However, these spots would be of opposite polarity to thereby repel the magnetic pins 13a, 13b downwardly. The thickness of the retaining plates 14 and 26, the strength of the magnetic fields of the spots 32, and the weight of the pins 13 are such that the activation card can repel the pins 13 into the wells to release the lock plate 16.

The locking plate may include a downwardly extending tab 43 which is adapted to activate a switch 44 by depressing the switch member 46. Electrical means such as solenoids or other circuits may be connected in circuit with the switch to be operated in response to unlocking of the mechanism. In the embodiment shown, the switch 44 and switch member 46 are located in line with the magnet block 11. The member 46 is moved by the downwardly extending tab 43. In this manner, it would be rather difficult to tamper with the lock from the front end by shortening out the switch or moving the switch member 46. The complete magnet block would have to be drilled out at the proper location to activate the switch.

Figure 10:
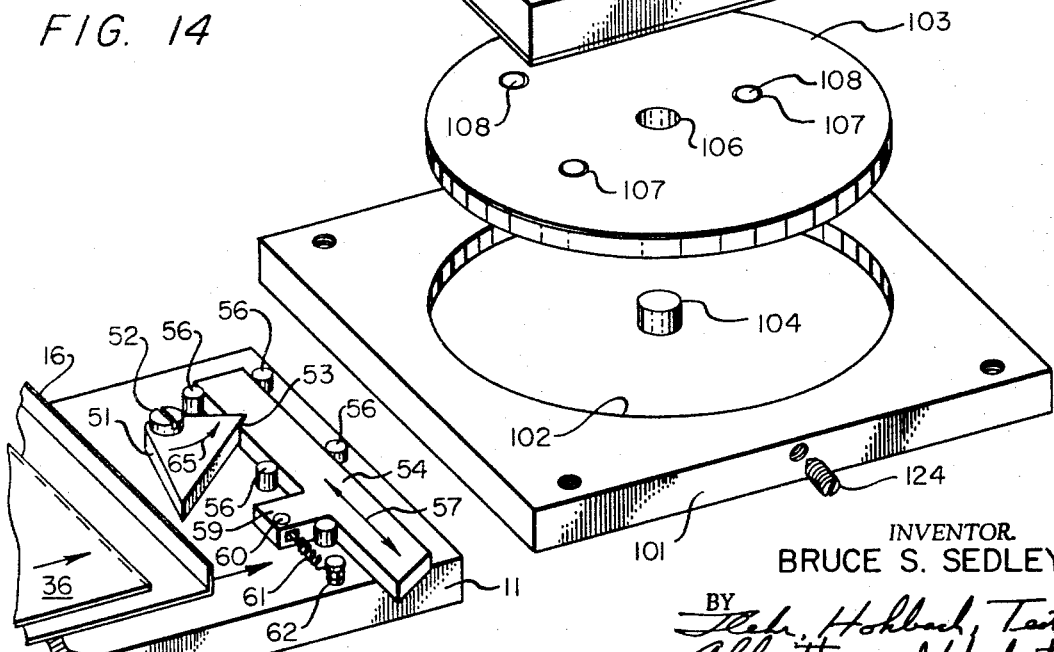
FIGURE 10 is a perspective view of a latch adapted to be operated by a magnetically operated mechanism.

Rather than operating an electrical switch, the lock plate can be used to operate a mechanical lock. Referring particularly to FIGURE 10, there is schematically illustrated a lock plate 16 which is adapted to abut against member 51 rotatably mounted on the magnetic block 11 by a pin or screw 52. The nose of member 51 is adapted to register in a notch 53 formed in bolt 54. The bolt may be guided by spaced pins 56 for movement in the direction shown by the arrow 57. A stop member 59 is provided to limit the movement of the bolt in either direction. Spring means 61 are attached between pin 60 and pin 62 mounted in block 11 to urge the bolt into its locking position. Movement of the lock plate 16 against the member 51 will rotate it in the direction shown by the arrow 65 which, in turn, will retract the bolt 57.

Upon removal of the code card, the spring urges the bolt back into projected position. The member 51 rotates clockwise and pushes the lock plate 16 outwardly to its normal position wherein the openings 24 of the lock plate 16 and wells 12 of magnet block are in registry.

It is seen that the lock, code combination set card and code combination activation card described permit a large number of combinations with a relatively small number of wells and locking pins. The combination of the lock can be changed by simply inserting a new set card.

An example of the use of a magnetically operated mechanism of the type described above is in maintaining security in a manufacturing plant having a number of shifts. A mechanism of the type described could be installed to control a turnstile. At the beginning of each shift, a different code combination set card would be inserted. Only those employees having code combination activation cards for that particular shift could gain entry.

Figure 9:
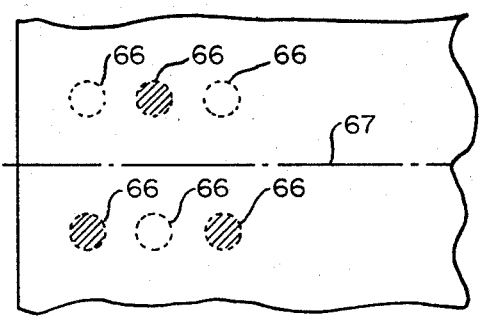
FIGURE 9 is a partial view of the center of a magnetic card which carries a duplicate code whereby it can be inserted with either face adjacent the locking pins for operation of the magnetically operated mechanism.
Figure 6:
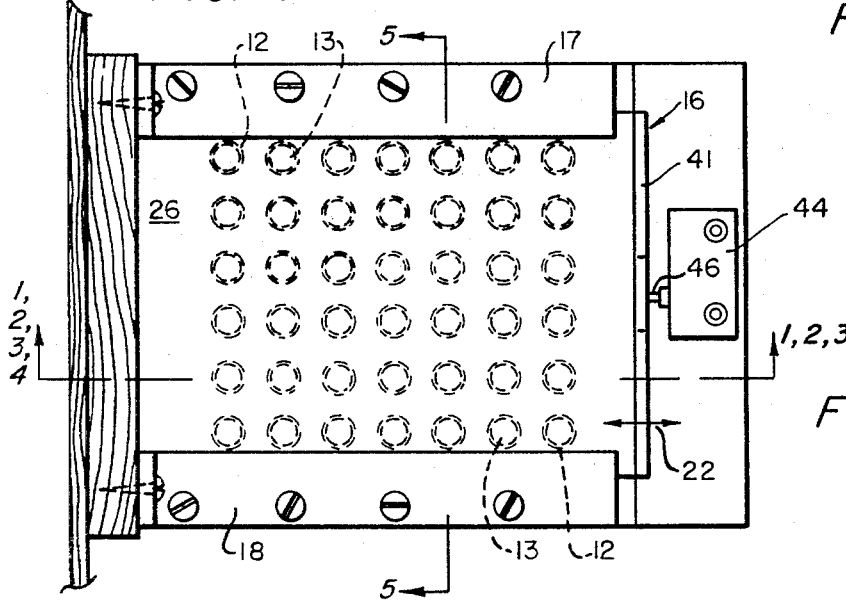
FIGURE 6 is a plan view of a magnetically operated mechanism in accordance with the invention.

The cards described above are adapted to be used in a single orientation. It is possible by employing duplicate and oppositely magnetized spots on each side of the centerline of the cards to operate them with either face in cooperation with the magnet pins. Such a card is illustrated in FIGURE 9. The card includes spots 66 located on each side of the centerline 67. Assuming the shaded spots are north poles and the unshaded spots are south poles, it is seen that if the card is turned over, the same orientation is obtained. Such a card would be particularly useful where the mechanism is employed in environments where it is operated by children; for example, story telling mechanisms in zoos, playgrounds and the like.

Figure 11:
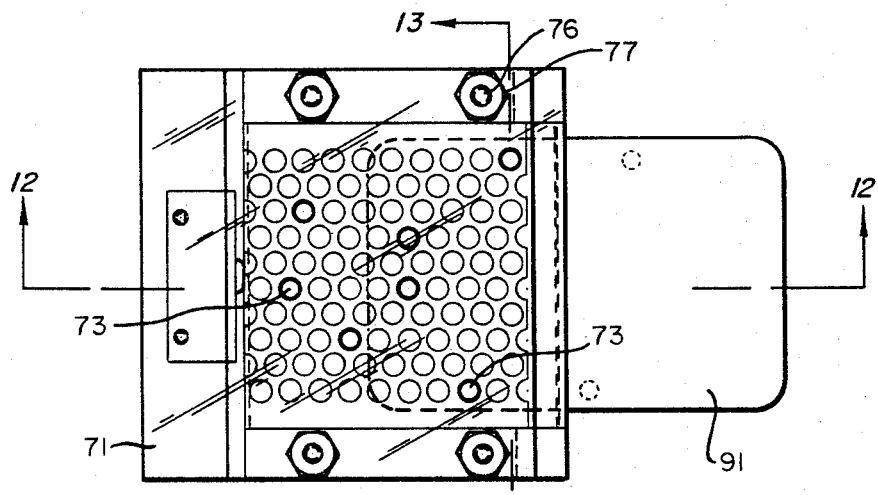
FIGURE 11 is a plan view of another magnetically operated mechanism showing a magnetic card.
Figure 12:
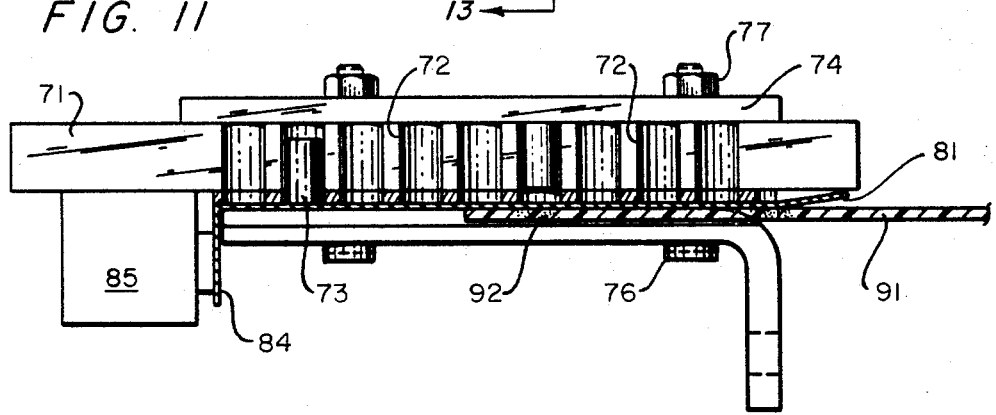
FIGURE 12 is an enlarged sectional view taken along the line 12—12 of FIGURE 11.
Figure 13:
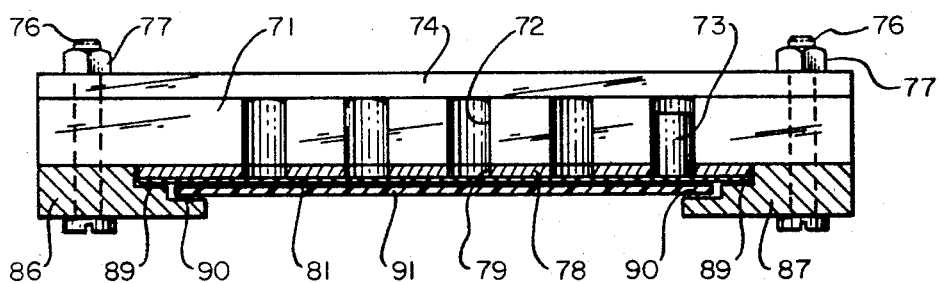
FIGURE 13 is an enlarged sectional view taken along the line 13—13 of FIGURE 11.

A simpler version of a magnetically operated mechanism employing a magnetic code activation card is shown in FIGURES 11–13. The lock comprises a magnet block 71 provided with a plurality of wells 72, selected ones of which receive magnet lock pins 73. An upper plate 74 is suitably affixed to the magnet block as, for example, by means of threaded screws or bolts 76 and nuts 77.

A locking plate 78 is carried below the magnet block 71 for slidable movement with respect thereto. The lock plate includes a plurality of wells 79 adapted to coincide with the wells 72 in the locked position. The lock plate may include a retaining plate or sheet 81 suitably affixed thereto to prevent the magnets from falling downwardly through the openings. As previously described, an alternate is to form wells having bottoms whereby to prevent the falling out of the magnet members. The front end of the plate 81 may be bent upwardly to provide a guide for a code activation card as will be described. The end of the lock plate includes a downwardly extending lip 84 which is adapted to abut the switch 85 to activate the same.

Guide means are provided for guiding the lock plate. Such guide means may comprise a pair of spaced rails or guides 86 and 87 which are suitably secured to the block as, for example, by being secured to the screws 76 with lower nuts 88. The guide members may include first and second shoulders 89 and 90 with the first shoulder adapted to receive the lock plate and backup member 81 to guide the same for sliding movement and the second shoulder adapted to receive and guide a card 91. The code card 91 is of the type previously described. The card shown in FIGURE 12 includes magnetized areas 92 which are adapted to coincide with lock pins 73 and have a magnetic pole such as to repel a corresponding pin. When the card is in its seated position and the card has the properly located magnetized spots, the locking elements will be urged upwardly to be retracted from the lock plate holes to unlock the same. Further movement of the card will cause the lock plate to slide and operate the switch 85.

The combination can be selected by disposing locking pins in selected wells and also by selecting the polarity of the pins whereby a coded card must not only have the proper location of magneized spots but they must also have the proper polarity. The open bottom allows foreign objects to fall out of the lock to prevent obstruction on the card receiving space. If a magnetic member of still another magnetic material is inserted, it will attract the pins and increase the locking action.

Figure 14:
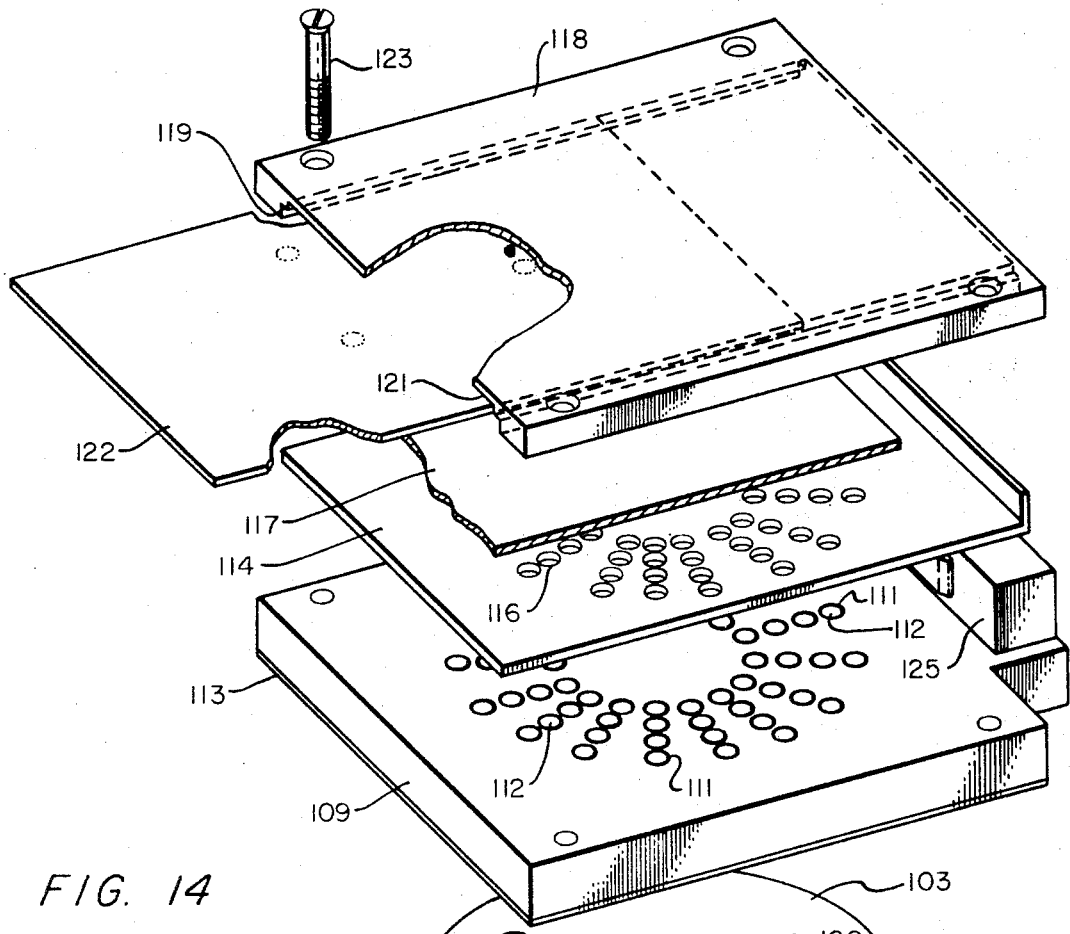
FIGURE 14 is an exploded view of another magnetically operated mechanism in accordance with the present invention.

Referring to FIGURE 14, there is shown a mechanism in which the combination is set by positioning of a code combination set member. The mechanism includes a base plate 101 having a recess 102 for receiving a code combination member 103 in the form of a disc. A pin 104 may be arranged at the center of the recess for registry with the opening 106 in the plate whereby the code combination set member can be rotated. The coded combination set member includes a plurality of wells or recesses 107 adapted to receive combination set magnet pins 108. A magnet block 109 is mounted over the code combination member and includes a plurality of wells 111 for receiving lock activation pins 112. These wells coincides with wells 107. The wells may include a bottom or a plate 113 to retain the locking pins. Overlying the magnet block is a movable plate 114 which has a plurality of wells 116 coinciding with the wells 111. A retaining sheet or member 117 may be provided on top of the locking member to prevent magnets from projecting through the openings. A guide member 118 having first shoulder 119 for guiding the lock plate 114 and sheet 117 and a second shoulder 121 for guiding a code activation card 122 is mounted on the magnet block. The complete assembly is assembled and held together by means of screws 123.

Operation of the device is similar to operation of the device shown in FIGURE 1–6. The difference is that rather than a code combination set card, there is a rotatable or positionable code combination set member. By inserting magnets in a plurality of the recesses or holes 107 of the code combination member, they will serve to repel corresponding locking pins disposed in the wells 111 of the magnet block. The combination set in the lock can be changed by merely rotating the member 103. Indexing means may be provided to provide an indication of the combination set in the lock. The member is locked in position by set screw 124. The magnets 108 in disc 103 repel pins 112 upwardly into lock plate 114. These pins will lock the plate. By inserting a code card having the proper combination, the magnets are repelled downwardly to release the lock plate. It can then be moved to activate a switch or other member 125.

The rotatable or positionable member 103 may be made of magnetic material such as iron or steel. Such material will then attract the magnet pins 112 disposed in the member 109 keeping them fully seated in the wells 111. Only those pins which are repelled by oppositely disposed set pins 108 will be projected upwardly into the locking member. The lock can then be operated in any position since it is not necessary to rely upon the effects of gravity to hold the unset pins seated in the wells 111.

Figure 15:
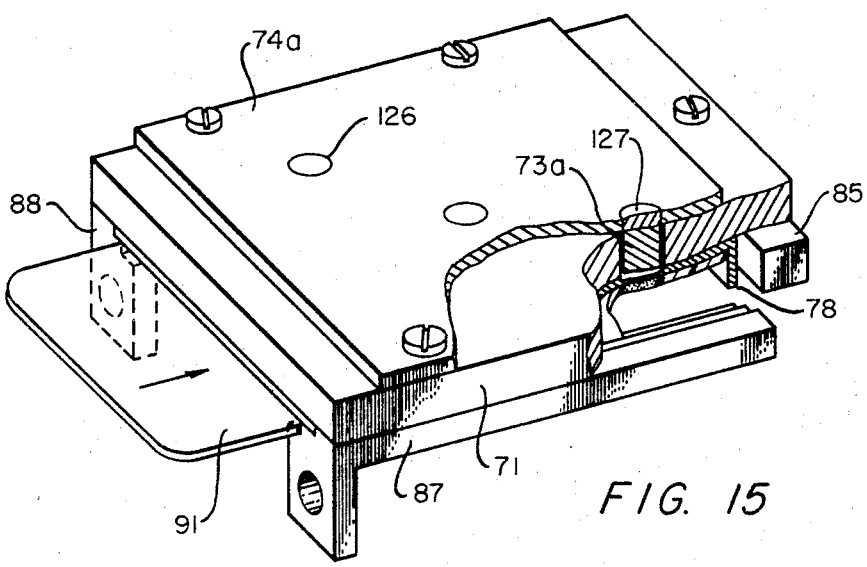
FIGURE 15 is a perspective view of another magnetically operated mechanism suitable for operation in substantially any orientation.

A mechanism similar to that shown in FIGURES 11–13 is shown in FIGURE 15. Like reference numerals are applied to like parts. However, in the lock shown in FIGURE 15, the upper retaining plates 74a includes a plurality of openings 126 adapted to receive slugs 127 magnetized of permanent magnet material. These slugs are magnetized so as to repeal the corresponding pin 73a into the locking well of the lock plate 78. Thus, the lock is locked whether it is in the position shown, where the gravity is drawing the pin into the hole of the lock plate, or the mechanism is in any other position since the magnets 127 serve to repel the pins into the lock well. The lock is unlocked by the card 91 which serves to overcome the repelling force of magnet 127 and release the lock plate.

Figure 16:
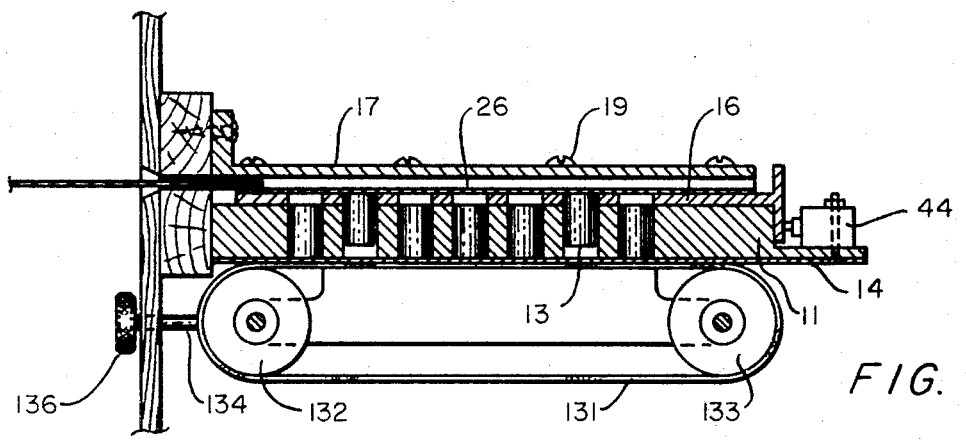
FIGURE 16 is a sectional elevational view of a magnetically operated mechanism including a movable code belt.

In FIGURE 16, there is shown a lock similar to that shown and described in FIGURES 1–6. Like reference numerals are applied to like parts. Rather than employing a code combination set card, a code combination set belt 131 is employed. As shown, a continuous belt is carried by spaced rollers 132 and 133. Suitable means, for example, a shaft 134 connected to gearing (not shown) serves to rotate the drive pulley 132 to thereby move the belt responsive ot rotation of knob 136. As the belt is moved, predetermined magnetized spots are brought into registry with magnet pin wells. A combination is set into the lock. Only an activation card having the proper corresponding combination will serve to unlock the mechanism.

Figure 17:
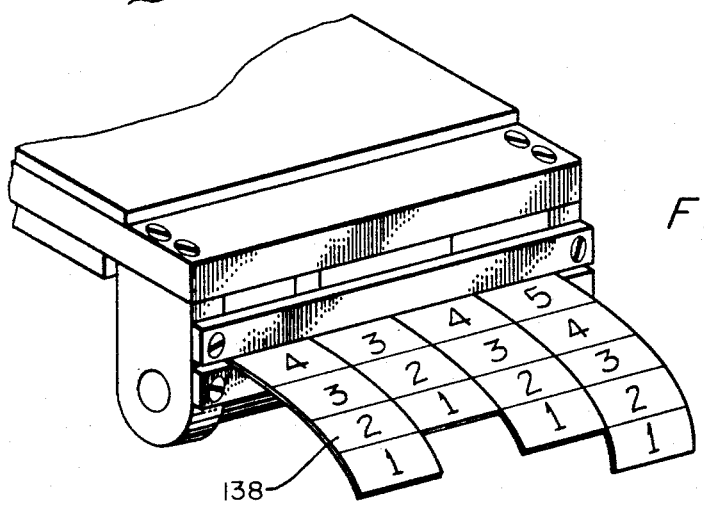
FIGURE 17 is a sectional view of a magnetically operated mechanism including independently movable code strips for setting the combination.

Referring to FIGURE 17, there is shown another means for setting a predetermined combination in the lock. In the lock of FIGURE 17, there is shown a plurality of of strips 138 of material which include indexing numbers. The strips carry a predetermined number of magnetized spots along their length. By inserting the strips to a particular depth, a predetermined combination can be set into the lock.

Thus, there has been described a magnetically operated mechanism including code combination set means and a code combination activation card which is adapted to unlock the mechanism and provide for operating associated apparatus. In the instance where code combination set cards are employed, the combination may be changed by employing a new card, whereas in other embodiments of the invention, the combination can be changed by positioning a movable member. In the simplest form, the combination can be set by inserting and/or removing pins at selected locations and properly orienting the same. The combination on the code combination activation and set cards is difficult to detect because both the location and sense of polarization of the magnetic spots must be ascertained. The cards are reusable and the combination easily and rapidly changed. This allows the manufacture of large quantities of cards and substantial savings. The code can be applied any time thereafter to any number of cards. Furthermore, the cards may be erased and recoded.

I claim:

1. A magnetically operated mechanism of the type adapted to have its combination set by a code combination set means and unlocked by a code activation card having a corresponding combination comprising a magnet block having a plurality of wells spaced and arranged in a predetermined pattern, a plurality of locking pins in said wells, a lock plate having wells adapted to register in the locked position with the magnet block wells, means for bringing said code combination set means in cooperative relationship with one face of said magnet block to operate on selected ones of said locking pins, and means at the other face of said magnet block for bringing said code activation card in cooperative relationship with the other face of said magnet block to operate on selected locking pins whereby to unlock the mechanism.

2. A magnetically operated mechanism of the type adapted to have its combination set by code combination set means and unlocked by a code activation card having a corresponding combination comprising a magnet block having a plurality of wells spaced and arranged in a predetermined pattern, a plurality of lock pins slidably carried in said wells, a lock plate having wells adapted in the locked position to register with the magnet block walls, code combination set means having a face adapted to cooperate with the magnet block, means presenting permanent magnet poles of selected polarity to said face at selected locations corresponding to the location of selected magnet block wells, means for bringing said code combination set means in cooperative relationship with the face of said magnet block to repel or attract selected ones of said locking pins in the corresponding magnet block wells, a code activation card comprising carrier means, magnetizable permanent magnet material carried by said carrier means, magnetized spots located at spots corresponding to the lock pin location with poles of selected polarity extending to said one face, and means at the other face of said magnet block for bringing said code card in cooperative relationship with said magnet block to repel selected lock pins whereby to unlock the corresponding lock plate.

3. A magnetically operated mechanism as in claim 2 in which said code combination set means comprises nonmagnetic carrier means, and magnetizable permanent magnet material carried by said carrier means, and magnetized spots located at predetermined locations corresponding to the lock pin location with a pole of selected polarity extending to one face.

4. A magnetically operated mechanism as in claim 2 in which said combination set means includes a plurality of permanent magnet means, and means for carrying said magnet means with selected poles extending to one surface of the same.

5. A magnetically operated mechanism as in claim 2 wherein said code combination set means is positionable to set one of a plurality of combinations in said mechanism.

6. A magnetically operated mechanism of the type adapted to have its locking combination set by a code combination set card to lock the same and to be unlocked by a code activation card, comprising a magnet block having a plurality of spaced holes, a lock plate having a plurality of holes with substantially the same dimensions and location as the spaced magnet block holes, means for mounting said lock plate and magnet block for slidable movement with respect to one another between a locked and unlocked position, a plurality of lock pins disposed in said holes and axially movable therein, means adjacent one face of said magnet block for receiving and guiding said code combination set card so that it is presented to said magnet block to set the combination in the mechanism, and means adjacent the other face of said magnet block for receiving and guiding said code activation card so that it is presented to said magnet block to unlock the mechanism.

7. A magnetically operated mechanism of the type adapted to have its combination set by code combination set means and unlocked by a code activation card having a coresponding combination comprising a magnet block having a plurality of wells spaced and arranged in a predetermined pattern, a plurality of lock pins slidably carried in said wells, a lock plate having wells adapted in the locked position of said mechanism to register with the magnet block wells, a code combination set means having a face adapted to cooperate with the magnet block, combination set means presenting permanent magnetic poles of selected polarity at selected locations corresponding to the location of selected magnet block wells, means for bringing said code combination set means in cooperative relationship with one face of said magnet block to repel or attract selected ones of said locking pins in the corresponding magnet block wells, a code activation card presenting magnet poles of selected polarity to one face of said card at selected locations and means at the other face of said magnet block for bringing said code activation card into cooperative relationship with said magnet block to operate on said selected lock pins whereby to unlock the mechanism.

References Cited

UNITED STATES PATENTS

| | | | | |
|---|---|---|---|---|
| 2,648,729 | 8/1953 | Noregaard | 200—45 |
| 2,769,873 | 11/1956 | Noregaard | 200—87 |
| 2,931,953 | 4/1960 | Barney | 317—134 |
| 3,111,834 | 11/1963 | Felson | 70—276 |
| 2,842,876 | 7/1958 | Chicoine et al. | 39—1 |

MARVIN A. CHAMPION, *Primary Examiner.*

R. L. WOLFE, *Assistant Examiner.*

U.S. Cl. X.R.

70—413